US009589462B1

(12) United States Patent
Amir (10) Patent No.: US 9,589,462 B1
(45) Date of Patent: Mar. 7, 2017

(54) SYSTEM AND METHOD FOR CCX BASED SENSOR DATA TRACKING WITH HIGHLY ASSURED DATA DELIVERY

(71) Applicant: Centrak, Inc., Newtown, PA (US)

(72) Inventor: Israel Amir, Newtown, PA (US)

(73) Assignee: CENTRAK, INC., Newtown, PA (US)

( * ) Notice: Subject to any disclaimer, the term of this patent is extended or adjusted under 35 U.S.C. 154(b) by 111 days.

(21) Appl. No.: 13/853,532

(22) Filed: Mar. 29, 2013

Related U.S. Application Data

(60) Provisional application No. 61/848,014, filed on Dec. 20, 2012.

(51) Int. Cl.
*G08B 23/00* (2006.01)
*G08C 19/24* (2006.01)

(52) U.S. Cl.
CPC .................................. *G08C 19/24* (2013.01)

(58) Field of Classification Search
CPC ...................................................... G08C 19/24
USPC ....... 340/870.02, 870.07, 10.4, 10.34, 10.41; 702/127; 374/E1.003
See application file for complete search history.

(56) References Cited

U.S. PATENT DOCUMENTS

| | | | |
|---|---|---|---|
| 6,720,866 B1* | 4/2004 | Sorrells et al. | 340/10.4 |
| 6,826,514 B1* | 11/2004 | Antico et al. | 702/188 |
| 7,505,465 B2* | 3/2009 | Reme | H04L 1/18 370/352 |
| 8,103,325 B2* | 1/2012 | Swedlow et al. | 600/323 |
| 8,390,472 B2* | 3/2013 | Cornwall | 340/815.69 |
| 8,823,544 B2* | 9/2014 | Mehta | 340/870.01 |
| 2004/0015318 A1* | 1/2004 | Heller et al. | 702/127 |
| 2005/0083197 A1* | 4/2005 | Glenn | G01F 23/0061 340/539.22 |
| 2007/0061065 A2* | 3/2007 | Krikelis | G08G 1/096716 701/117 |
| 2008/0071899 A1* | 3/2008 | Odaka | H04L 41/06 709/223 |
| 2009/0059916 A1* | 3/2009 | DeCusatis | H04L 1/188 370/389 |
| 2010/0277297 A1* | 11/2010 | Eckel et al. | 340/435 |
| 2010/0277342 A1* | 11/2010 | Sicurello | H04Q 9/00 340/870.3 |
| 2011/0092164 A1* | 4/2011 | Spanhake | 455/67.11 |
| 2012/0047137 A1* | 2/2012 | Stergiou et al. | 707/736 |
| 2012/0191415 A1* | 7/2012 | Naito et al. | 702/188 |
| 2013/0078912 A1* | 3/2013 | San Vicente | A61B 5/0015 455/39 |
| 2013/0176037 A1* | 7/2013 | Waki et al. | 324/658 |

(Continued)

*Primary Examiner* — Quang D Pham
(74) *Attorney, Agent, or Firm* — Maldjian Law Group LLC (57) ABSTRACT

A tag, system, and method for wireless sensor data collection, the system including: a data collection tag, the tag including: a sensor configured to provide, at a first repetition rate, a present measurement of an environmental characteristic; a memory configured to store previous measurements of the environmental characteristic; and a transmitter module configured to transmit the present measurement of the environmental characteristic and at least one previous measurement of the environmental characteristic; an access point configured to receive a transmission from the data collection tag; and a controller communicatively coupled to the access point, the controlled configured to store historical measurements extracted from the transmission from the data collection tag.

12 Claims, 4 Drawing Sheets

(56) References Cited

U.S. PATENT DOCUMENTS

| | | | |
|---|---|---|---|
| 2013/0212168 A1* | 8/2013 | Bonasera et al. | 709/203 |
| 2013/0214938 A1* | 8/2013 | Kim et al. | 340/870.07 |
| 2013/0262031 A1* | 10/2013 | Oertli | G06Q 10/08 702/179 |
| 2014/0029587 A1* | 1/2014 | Hirata | H04L 5/0055 370/336 |
| 2014/0273821 A1* | 9/2014 | Miller et al. | 455/41.1 |
| 2014/0278144 A1* | 9/2014 | Risk et al. | 702/24 |

\* cited by examiner

SYSTEM AND METHOD FOR CCX BASED SENSOR DATA TRACKING WITH HIGHLY ASSURED DATA DELIVERY

CROSS-REFERENCE TO RELATED APPLICATIONS

This application claims the benefit of U.S. Provisional Patent Application Ser. No. 61/848,014, filed on Dec. 20, 2012, the entire content of which is hereby incorporated by reference in its entirety.

BACKGROUND

Field of the Invention

Embodiments in accordance with the present invention relate to methods and systems for sensor data collection with high assurance of data delivery.

Description of Related Art

Automatic wireless temperature monitoring is prevalent in workplaces such as hospitals. Individual monitors often use Wi-Fi signals to report the most recent measurement. Although standard Wi-Fi may provide bi-directional communication, a variation referred to as CCX (or CCX-compatible Wi-Fi, or the like) may be used in order to conserve battery life by a monitor. CCX-compatible Wi-Fi provides only one-directional communication.

A drawback of the conventional art using CCX-compatible Wi-Fi is that an individual monitor, when transmitting the most recent measurement, will not know whether the transmission was successful, because the one-directional nature of communication does not provide a way for status, acknowledgement, feedback or the like to be returned to the monitor. This may result in lost measurements if there has been a communication problem. Therefore, a need exists to provide a monitoring system that can provide data delivery with enhanced probability of success.

SUMMARY

In one embodiments in accordance with the present invention, a wireless sensor data collection tag, includes: a sensor configured to provide, at a first repetition rate, a present measurement of an environmental characteristic; a memory configured to store previous measurements of the environmental characteristic; and a transmitter module configured to transmit the present measurement of the environmental characteristic and at least one previous measurement of the environmental characteristic.

In one embodiments in accordance with the present invention, a system for wireless sensor data collection includes: a wireless sensor data collection tag; an access point configured to receive a transmission from the wireless sensor data collection tag; and a controller communicatively coupled to the access point, the controller configured to store historical measurements extracted from the transmission from the wireless sensor data collection tag.

In one embodiments in accordance with the present invention, a method to wirelessly collect sensor data comprises the steps of: measuring, at a first repetition rate, a present value of an environmental characteristic; recalling from a memory one or more previous values of the environmental characteristic; and transmitting the present value of the environmental characteristic and the one or more previous values of the environmental characteristic.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The disclosure will be illustrated below in conjunction with an exemplary communication system. Although well suited for use with, e.g., a system using a server(s) and/or database(s), the disclosure is not limited to use with any particular type of communication system or configuration of system elements. Those skilled in the art will recognize that the disclosed techniques may be used in any communication application in which it is desirable to utilize location sensors and other sensors (e.g., temperature and humidity) that communicate with a central monitor.

The exemplary systems and methods of this disclosure may also be described in relation to software, modules, and associated hardware. However, to avoid unnecessarily obscuring the present disclosure, the following description omits well-known structures, components and devices that may be shown in block diagram form, are well known, or are otherwise summarized.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

As used herein, the term "Wi-Fi" or "conventional Wi-Fi" refers generally to a bi-directional radio communication technology that operates based on one or more of the Institute of Electrical and Electronics Engineers ("IEEE") 802.11 family of standards, which are incorporated herein by reference. The IEEE 802.11 standards specify the RF and protocol characteristics of a bi-directional radio communication system.

As used herein, the terms "CCX" or "Cisco CCX" or "CCX-compatible Wi-Fi" refer generally to "Cisco™ Compatible Extensions Program for Wi-Fi Tags." This provides a middleware that allows users of Cisco-compatible network equipment to benefit from extensions developed by third-party developers. Consistency and interoperability are improved by having third-party developers develop extensions that are verified to interoperate with the CCX middleware. Systems from other vendors that are similar to CCX may be referred to herein as "CCX-compatible" systems. CCX-compatible systems generally provide a one-directional communication protocol.

As used herein, the term "module" refers generally to a logical sequence or association of steps, processes or components. For example, a software module may comprise a set of associated routines or subroutines within a computer program. Alternatively, a module may comprise a substantially self-contained hardware device or circuit device. A module may also comprise a logical set of processes irrespective of any software or hardware implementation.

As used herein, the term "transmitter" may generally comprise any device, circuit, or apparatus capable of transmitting an electrical, electromagnetic, or optical signal. As used herein, the term "receiver" may generally comprise any device, circuit, or apparatus capable of receiving an electrical, electromagnetic, or optical signal. As used herein, the term "transceiver" may generally comprise any device, circuit, or apparatus capable of transmitting and receiving an electrical, electromagnetic, or optical signal.

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

Automatic wireless temperature monitoring is prevalent in a variety of industries where temperature must be closely monitored for safety or regulatory reasons, such as hospitals, and where the merchandise may degrade if its temperature is not controlled within limits (e.g., food, medicine, etc.). This may include phases involving delivery, storage and sales. Other environmental parameters may also be important due to the nature of what items or processes (e.g., manufacturing processes) are being monitored. For example, humidity, exposure to light, motion sensors, orientation of the product (e.g., whether or not it is upright), etc. may be important.

In many such places a facility is already wired with a communication infrastructure, particularly a Wi-Fi infrastructure, and wireless monitoring is achieved by connecting temperature sensors with small Wi-Fi transceivers (i.e., tags) that can transmit the temperature to a central server and distribute the measurements and to applications that need to monitor the temperature. In order to install and maintain a conventional Wi-Fi system, some technical issues must be addressed, including:

1. An IP address must be assigned to a conventional Wi-Fi transceiver;
2. The Wi-Fi security system needs to be set; and
3. Power needs to be provided to the Wi-Fi transceiver.

Conventional Wi-Fi uses power relatively inefficiently. Consequently, a battery-operated conventional Wi-Fi transceiver must use large and/or heavy batteries, or the batteries must be replaced relatively frequently.

In order to help overcome technical issues such as these, one-directional Wi-Fi protocols have been developed, which do not require set up of (or acquisition of) an IP address from a network. An example of such a protocol is the CCX extensions to the Wi-Fi protocol, promulgated by Cisco. Such protocols may not need to use security protocols because the access point ("AP") directs the signals to only a single location (e.g., a Cisco Mobility Services Engine ("MSE")). Furthermore, because tags using such a protocol are one-directional (i.e., they only transmit communications without receiving communications), such tags cannot gain any control of a network.

One-directional protocols are relatively more power efficient than standard Wi-Fi and allow for relatively longer battery life and/or smaller batteries. However, a drawback when used to record sensor information is that sensor tags using a one-directional communication protocol do not provide an automatic way to protect the user and the data from loss of data during outages (e.g., a network down time, server failure, etc.). This is because the sensor tag and its Wi-Fi wireless transmitter do not receive an acknowledgement that data it sent was in fact received by the system. In other words, even if a sensor tag records measurements, there is no way for the sensor tag to know if its transmission of the data failed. Lack of guaranteed data delivery, or substantially guaranteed data delivery, is a major drawback in some applications of the technology. For example, hospitals may be required to have a record of all historical recorded temperatures.

In the past, problems in automated measurements have been inadequately addressed. For example, if a conventional temperature measurement system fails in a hospital, then nurses on the floor may start manual registration of recorded temperatures. Manual registration is very cumbersome, error-prone, and is quite problematic to implement and supervise. Furthermore, data that has been manually registered must then be manually entered into a monitoring system controller, which may also be cumbersome, error-prone, and difficult to implement and supervise.

A second method of the known art to deal with problems in automated measurements may including designing the monitoring tags to record the temperatures continuously, storing multiple measurements on the tag itself as offline measurements. If a communication loss occurs, and after the system recovers from its fault condition, then nurses, employee or other attendants can command the tag (e.g., by pressing a button on the tag, or the like) to transmit the offline measurements to the system. This is slightly less cumbersome but still problematic. For example, in a large institution there may be hundreds of sensors, and requiring such unplanned manual operation is not simple and is time consuming. Therefore, a need exists to substantially guarantee data delivery automatically after a communication outage.

Embodiments in accordance with the present invention are directed to usage of the physical layer and data link layer of a Wi-Fi based network. However, embodiments do not use higher layers of conventional Wi-Fi networking, and in particular do not use conventional Wi-Fi networking protocols (i.e., the network layer and above). Instead, embodiments may use one-directional networking protocols such as CCX. Other wireless networking vendors (e.g., Aruba™) may offer similar one-directional networking protocols that use the Wi-Fi physical layer, however persons of skill in the art will recognize how to adapt the embodiments herein to various vendors' one-directional networking protocol systems.

By transmitting data packets by use of the physical layer and data link layer of a Wi-Fi based network, embodiments in accordance with the present invention adhere to the basic modulation and data rates of the IEEE 802.11 wireless interface, while using one-directional communication without retransmissions. A system in accordance with an embodiment of the present invention may include access points ("APs") that is configured to receive these special data packets. Such special packets may be forwarded by the access point usually untouched to a controller that can be accessed by users through APIs available at user interface terminals. The special packets may have added additional information (e.g., signal strength) that may be needed for other aspects of system operation. The special packets are typically small (e.g., 10-30 bytes) and as such most of the power involved in transmission of the special packets is due to overhead needed for setting up the device to facilitate transmission and reception so that the AP can receive the data.

Figure 1:
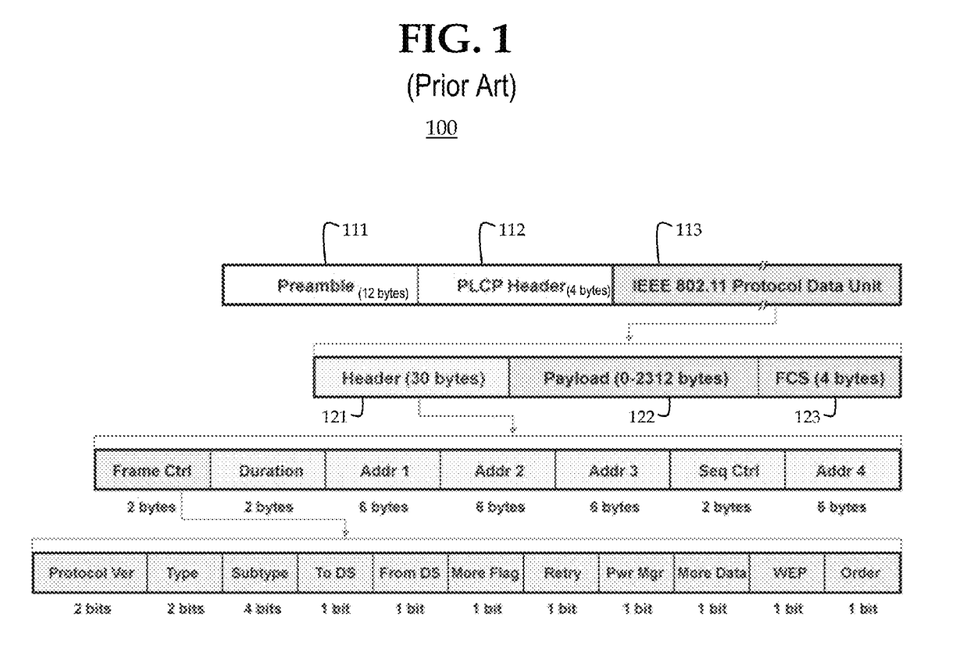
FIG. 1 is a diagram of an IEEE 802.11 header as known in the art.

FIG. 1 illustrates an IEEE 802.11 frame format 100 as known in the art. Frame format 100 may be divided into a twelve-byte preamble field 111, a four-byte physical layer convergence procedure ("PLCP") header field 112, and a variable-length protocol data unit ("PDU") field 113. PDU field 113 may be further subdivided into a thirty-byte header field 121, a variable-length payload field 122, and a four-byte frame check sequence ("FCS") field 123. Payload field 122 may vary in length between zero and 2,312 bytes. Therefore, the minimum length for frame format 100 is fifty bytes when the payload field 122 is of zero length.

An individual temperature measurement may be compactly encoded, such that as little as one byte may convey an environmental measurement within a useful range and within a useful resolution. Useful range and resolution will be dependent upon the application. In some circumstances, such as if transmitting a binary (i.e., Boolean) status or measurement (e.g., whether a measurement is over or under a threshold, or whether some event such as motion has been detected since the last report, etc.), as little as a single bit may be adequate. It is clear from FIG. 1 that when the variable-length PDU field 113 is small, the overwhelming majority of bytes transmitted in an 802.11 frame are devoted to overhead purposes rather than payload (i.e., data-carrying) purposes. Therefore, the amount of data in the PDU field 113 may be increased without significantly affecting the overall length of the 802.11 frame, and consequently without significantly affecting the power consumption needed to transmit the 802.11 frame.

In one embodiment of the current invention, a tag does not discard a past measurement immediately after reporting it or when a new measurement is made. Instead, embodiments may retain past measurements by storing the past measurements in a circular buffer (i.e., first in, first out ("FIFO") buffer). This buffer should be set as long as practical, and once the buffer is full then the oldest measurements may be overwritten by a new measurement. In one preferred embodiment the buffer size may be set for thirty days of measured data.

When a new measurement is recorded, the new measurement may be transmitted by the tag to the access point, along with at least a pre-determined subset of recent past measurement history recorded in the circular buffer. The current measurement and historical measurements are transmitted together in the variable-length PDU field 113 of a single 802.11 frame. A system controller, upon receiving the 802.11 frame and knowing that the variable-length PDU field 113 includes a pre-determined subset of recent past measurements, may compare its history the measurement stored in local memory with the history of the measurement contained in the PDU field 113, and determine whether a measurement was missing and, if determined to be missing, extract the missing measurement(s) from PDU field 113. By adding the redundancy of repeating the transmission of a recorded measurement several times, this process provides increased assurance that recorded measurements will be reported, at least no later than shortly after the end of an outage or network disruption. The level of assurance depends upon how much recent historical data is included in the PDU field 113 with each 802.11 frame, and upon an expected probability distribution of the length of outages or network disruptions. The process also assumes that tags remain sufficiently powered during extended outages or network disruptions in order to record measurements. If the level of assurance is sufficiently high, it may be deemed that the data delivery is guaranteed or substantially guaranteed. For example, if a network disruption has lasted no more than an hour, and the tag is programmed to record data hourly and report at least two hours of measurements with each 802.11 frame, then a system in accordance with an embodiment of the present invention will be able to recover the data recorded during the network disruption.

At tag startup or initialization, a code may be stored in portions of memory to indicate that historical measurements are not available for the indicated time period.

Figure 2A:
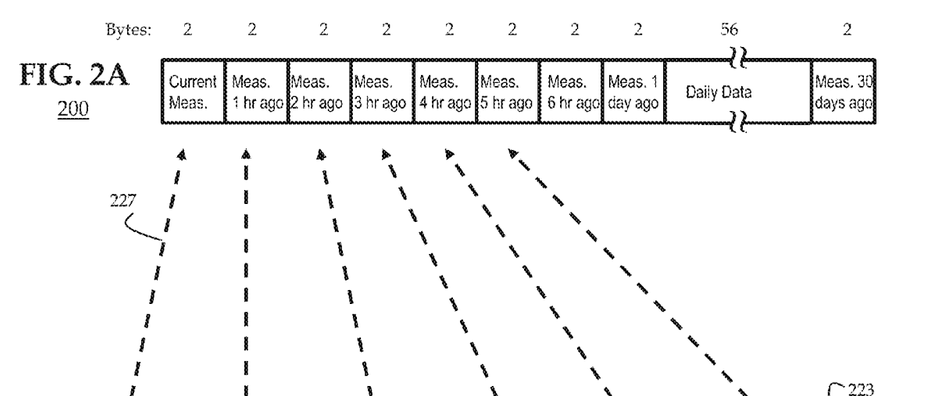
FIG. 2A is a diagram depicting a layout of a PDU field configured to report historical measurements in accordance with an embodiment of the present invention.

Suppose a current measurement from a sensor is to be measured and reported each minute, along with a historical report of past measurements on an hourly basis or daily basis. FIG. 2A illustrates an embodiment 200 of PDU field 113 in accordance with the present invention, in which 36 previous measurements may be transmitted with each minute's transmission of new data. The first six previous measurements may represent measurements for the last six hours (i.e., one per hour) and the following 30 previous measurements may represent the last 30 days of measurements (i.e., one per 24-hour interval).

Figure 2B:
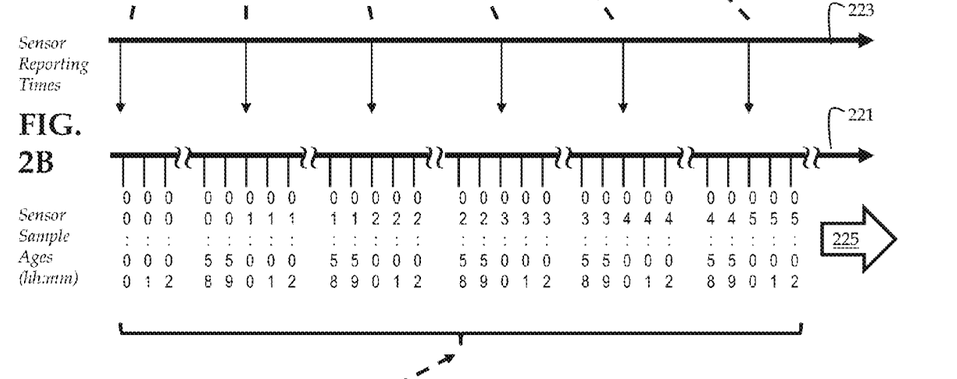
FIG. 2B is a mapping of historical measurements to sensor measurement times over a relatively short time interval, in accordance with an embodiment of the present invention.

FIG. 2B illustrates a detailed reporting scheme that supports embodiment 200 of PDU field 113, in accordance with an embodiment of the present invention. FIG. 2B illustrates a sensor sampling age timeline 221 and a sensor reporting timeline 223. Sampling timeline 221 illustrates sensors being sampled at a relatively frequent rate, i.e., once per minute, having ages hh:mm. Sampling timeline 221 as illustrated starts with a current measurement at 00:00 on the left and continuing to a measurement having an age of 05:02 (i.e., taken 5 hours and 2 minutes ago) on the right.

Sensor measurements may be stored in memory as a logical shift buffer. As each new minute's measurement is taken, the previous measurements' ages increase by one minute, which has the effect of shifting the data for each point of sampling timeline 221 by one position to the right, as illustrated by arrow 225.

FIG. 2B also illustrates sensor reporting timeline 223 in the form of a comb function. Reporting timeline 223 illustrates the present sensor measurement (i.e., at age 00:00) being reported contemporaneously as the current measurement 227, plus previously-reported sensors measurements being re-reported (i.e., re-transmitted) at a relatively slower rate, which may depend upon the age of the sample. For example, in one embodiment, measurements up to six hours old may be re-reported once per hour for six hours, and measurements more than six hours old up to 30 days old may be re-reported once per day. By this process, a measurement taken now will be reported now, and will also be re-reported sixty minutes from now as the "1 hr ago" measurement, and so forth. One minute from now, as timeline 221 shifts by one minute as indicated by arrow 225, a new current measurement 227 will be reported, and previous measurements that one minute ago had ages 00:59, 01:59, etc., will be re-reported as measurements take one hour ago, two hours ago, and so forth. In this way, reporting timeline 223, taking the form of a comb function, provides a sparse set of re-reported measurements in which the reporting period of the comb (e.g., one hour) is a multiple of the measurement period (e.g., one minute). The comb function may include more than one section having different multiplicities, e.g., a greater multiple of the measurement period for older measurements (e.g., one day re-reporting for measurements more than six hours old), thereby providing more than one sparse set of re-reported measurements at different intervals.

Figure 2C:
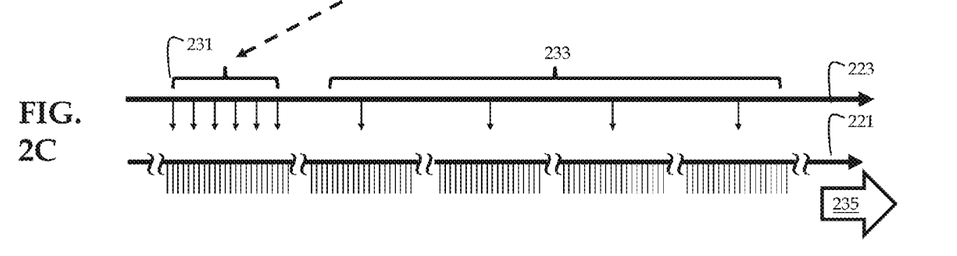
FIG. 2C is a mapping of historical measurements to sensor measurement times over a relatively wide time interval, in accordance with an embodiment of the present invention.

FIG. 2C illustrates sensor reporting timeline 223 over a longer period of time. During a first interval 231, measurements may be reported at a first frequency (e.g., once per hour). During a second interval 233, measurements may be reported at a second frequency (e.g., once per day). For sake of clarity, some minute measurement markers have been omitted. As illustrated, the reporting comb function has a finer pitch to the comb during first interval 231 as compared to the pitch of the comb function during second interval 233. Each new minute's measurement increases the ages of all previous measurements by one minute, which has the effect of shifting the data for each point of sampling timeline 221 by one position to the right, as illustrated by arrow 235.

Sampling rates and reporting rates are understood to represent average rates that may include relatively minor variations arising from sources such as tolerances, processing loads, dither, and so forth.

In some embodiments in accordance with the present invention, the repetition

For network disruptions that last less than six hours, embodiments shown in FIGS. 2A-2C are able to retrieve all missing minute data within one hour of the end of the disruption. If the disruption is longer than six hours, embodiments will need to wait 24 hours to get back all the missing minute data-points of the last 30 days. In this embodiment, each data point is transmitted 36 times, and this provides redundancy so that even if a transmission is missed because of a collision, the data-points will be transmitted again and likely eventually will be received by the access point and system.

In other embodiments, hourly measurements older than six hours may be reported (e.g., hourly measurements going back 24 hours), at the expense of a longer PDU 113 field (assuming the length is still within the maximum allowable length). The longer PDU 113, if too long, would overly dominate the entire length of the 802.11 frame, and overly consume power by the tag to transmit.

A combination of the amount of history that is reported with each measurement, and the number of bytes needed to report each measurement, may be selected such that power consumption may be only about 70% higher when transmitting a packet in accordance with an embodiment of the present invention, as compared to the power consumption needed to transmit a data packet with just a single measurement. The overall extra, additional, power may be even less if the data redundancy that is inherent in the sampling and reporting process of FIGS. 2A-2C allows for faster data rates, since a missed measurement will be reported in the future. The reason for this non-linear behavior of power consumption is that the fixed overhead for transmitting a Wi-Fi packet is so large that adding these additional measurements in PDU field 113 is not substantial for data measurements that individually need only a small number of bytes to represent.

In other embodiments in accordance with the present invention, a tag may be configured to record data at one repetition rate (e.g., once per minute), but be configured to report data in a burst at a second repetition rate (e.g., every five minutes). The second repetition period may be a multiple of the first repetition period, or equivalently the first repetition rate may be a multiple of the second repetition rate. In this way, a system may record data at a time resolution commensurate with the first repetition rate, but the tags expend energy commensurate with the second repetition rate.

Figure 3:
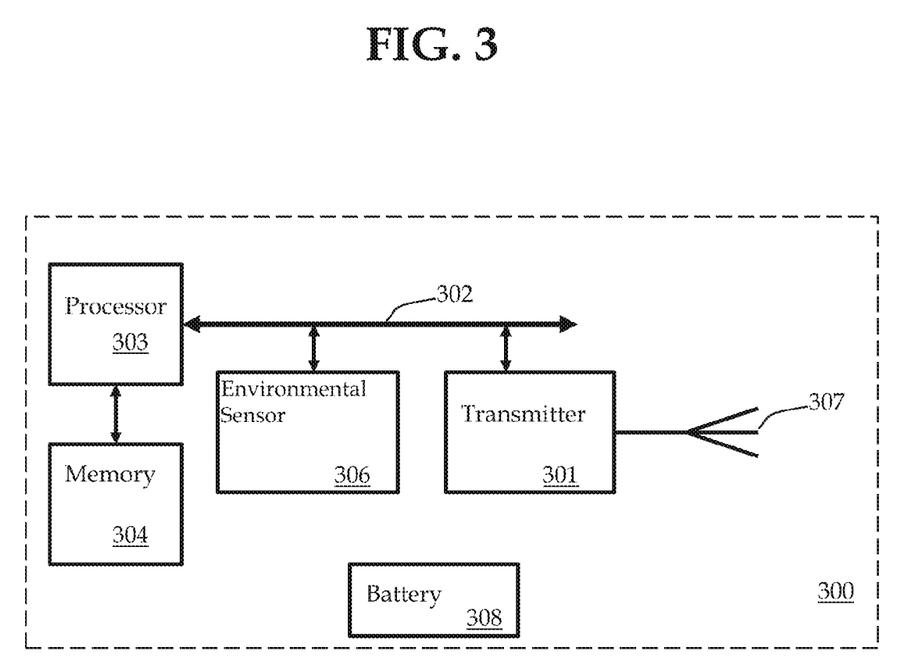
FIG. 3 is a diagram depicting at a high level of abstraction a measurement sensor tag in accordance with an embodiment of the present invention.

FIG. 3 illustrates at a high level of abstraction a block diagram of a tag 300 in accordance with an embodiment of the present invention. Tag 300 includes a transmitter 301, which may function as, e.g., a Wi-Fi communication interface at physical and data link layers. Transmitter 301 may be communicatively coupled via data bus 302 with processor 303. Processor 303 is communicatively coupled with memory 304. Memory 304 may be configured to store data (including a circular memory of sensor readings), configuration settings, and the like, and to store instructions that, when performed by processor 303, cause tag 300 to perform functions described herein. Tag 300 may further include one or more environmental sensors 306. Environmental sensors 306 may include sensors related to temperature, humidity, orientation, motion sensing, light sensing, and so forth. Sensor 306 may be communicatively coupled via data bus 302 with processor 303. Transmitter 301 is coupled to antenna 307 for transmission of RF signals. A battery 308 is used to provide electrical power to components of tag 300. Persons of skill in the art will realize that the high-level depiction of FIG. 3 omits certain known features such as internal circuitry, battery charging interface, and so forth.

A system in accordance with an embodiment of the present invention may include a system controller, a plurality of tags as described herein, and one or more access points such that an access point is communicatively coupled to at least one tag and/or a tag is communicatively coupled to at least one access point. The system controller includes a processor coupled to a memory, the memory configured to store instructions that, when carried out by the processor, may perform functions described herein.

Figure 4:
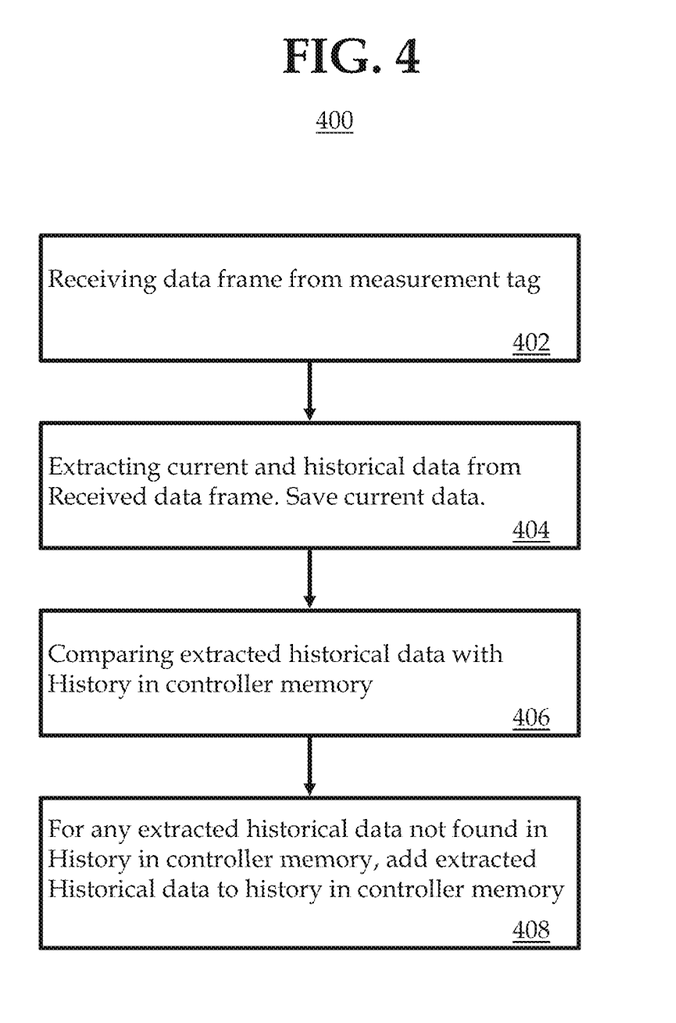
FIG. 4 is a diagram depicting at a high level of abstraction a method for reporting historical measurements accordance with another embodiment of the present invention.

A method 400 in accordance with an embodiment of the present invention may be depicted in FIG. 4. Method 400 begins at step 402, at which a system controller receives data frames from one or more tags, via an access point. Next, control of method 400 passes to step 404, at which current data and historical data embedded in the data frame is extracted by the system controller. Current data will be saved. Next, at step 406, the system controller may compare the extracted historical measurements with a measurement history maintained by the system controller. If the system controller detects that the extracted historical measurements include measurements that are missing from the measurement history maintained by the system controller, the system controller will update its measurement history with the missing measurements received from the tag. The process may be repeated each time a data frame is received from a tag.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present invention may be dependent on various considerations, such as the speed or efficiency requirements of the system, the particular function, and the particular software or hardware systems being utilized.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. §112, 6, and any claim without the word "means" is not so intended.

What is claimed is:

1. A one-directional wireless data collection system to provide highly assured data delivery to recover data recorded by a sensor of a tag during a network disruption, the system comprising:

the tag, the tag comprising:
    the sensor configured to provide a measurement of an environmental characteristic at a first average repetition rate R;
    a memory coupled to the sensor and configured to store M previous measurements of the environmental characteristic measured by the sensor; and
    a transmitter module coupled to the memory and configured to transmit a plurality of transmissions, each transmission comprising a present measurement of the environmental characteristic and a plurality of previous measurements of the environmental characteristic selected from the M previous measurements; and a system controller to wirelessly receive the plurality of transmissions from the tag, the system controller coupled to a database of received measurements of the environmental characteristic, the system controller programmed to perform the steps of:

extracting the present measurement and the plurality of previous measurements of the environmental characteristic from each respective transmission of the plurality of transmissions;

adding the present measurement of the environmental characteristic to the database;

detecting, in each respective transmission, any of the previous measurements of the plurality of previous measurements missing from the database by comparing said plurality of previous measurement of the environmental characteristic from the respective transmission with the received measurements of the environmental characteristic in the database;

for said detected previous measurements, adding said detected previous measurements to the database, without request for retransmission of said detected previous measurements, wherein each transmission contains a different plurality of previous measurements compared to an immediately-preceding transmission, and wherein the plurality of previous measurements comprises a subset of the M previous measurements of the environmental characteristic, and the subset comprises measurements to be reported at a first rate that is N1 times slower than the first average repetition rate R.

2. The system of claim 1, wherein a second member of the subset of the M previous measurements comprises a measurement to be reported at a second rate that is N2 times slower than the first average repetition rate R, in order to allow faster reconstruction with lower time resolution, wherein N1 is different than N2.

3. The system of claim 1, wherein the first rate comprises a rate selected from a group consisting of once per minute, once per five minutes, once per fifteen minutes, once per thirty minutes, once per one hour, once per six hours and once per twenty-four hours.

4. The system of claim 1, wherein the first rate is configured to decrease with age of the plurality of previous measurements.

5. The system of claim 1, wherein where the environmental characteristic comprises one of a temperature, a humidity, or a binary status.

6. The system of claim 1, wherein the present measurement and the previous measurements are configured to be transmitted together in one field of one data frame in each respective transmission from the tag.

7. A method to provide one-directional wireless, highly assured data delivery to recover data recorded by a sensor of a tag during a network disruption, the method comprising:

sensing, by use of the sensor, a measurement of an environmental characteristic at a first average repetition rate R;

storing, in a memory coupled to the sensor, M previous measurements of the environmental characteristic measured by the sensor; and transmitting, by a transmitter module coupled to the memory, a plurality of transmissions, each transmission comprising the present measurement of the environmental characteristic and a plurality of previous measurements of the environmental characteristic selected the M previous measurements;

wirelessly receiving, by a system controller, the plurality of transmissions, the system controller coupled to a database of received measurements of the environmental characteristic;

extracting, by the system controller, the present measurement and the plurality of previous measurements of the environmental characteristic from each respective transmission of the plurality of transmissions;

adding, by the system controller, the present measurement of the environmental characteristic to the database;

detecting, by the system controller, in each respective transmission, any of the previous measurements of the plurality of previous measurements missing from the database by comparing the plurality of previous measurement of the environmental characteristic from the respective transmission with the received measurements of the environmental characteristic in the database;

for said detected previous measurements, adding by the system controller said detected previous measurements to the database, without request for retransmission of said detected previous measurements, wherein each transmission contains a different plurality of previous measurements compared to an immediately-preceding transmission, and wherein the plurality of previous measurements comprises a subset of the M previous measurements of the environmental characteristic, and the subset comprises measurements to be reported at a first rate that is N1 times slower than the first average repetition rate R.

8. The method of claim 7, wherein a second member of the subset of the M previous measurements comprises a measurement to be reported at a second rate that is N2 times slower than the first average repetition rate R, in order to allow faster reconstruction with lower time resolution, wherein N1 is different than N2.

9. The method of claim 7, wherein the first rate comprises a rate selected from a group consisting of once per minute, once per five minutes, once per fifteen minutes, once per thirty minutes, once per one hour, once per six hours and once per twenty-four hours.

10. The method of claim 7, wherein the first rate is configured to decrease with age of the plurality of previous measurements.

11. The method of claim 7, wherein the environmental characteristic comprises one of a temperature, a humidity, or a binary status.

12. The method of claim 7, wherein the present measurement and the plurality of previous measurements are configured to be transmitted together in one field of one data frame in each respective transmission from the tag.

* * * * *